(No Model.)
J. C. HIRST & E. DICKIE.
TOOL HANDLE.
No. 324,379. Patented Aug. 18, 1885.
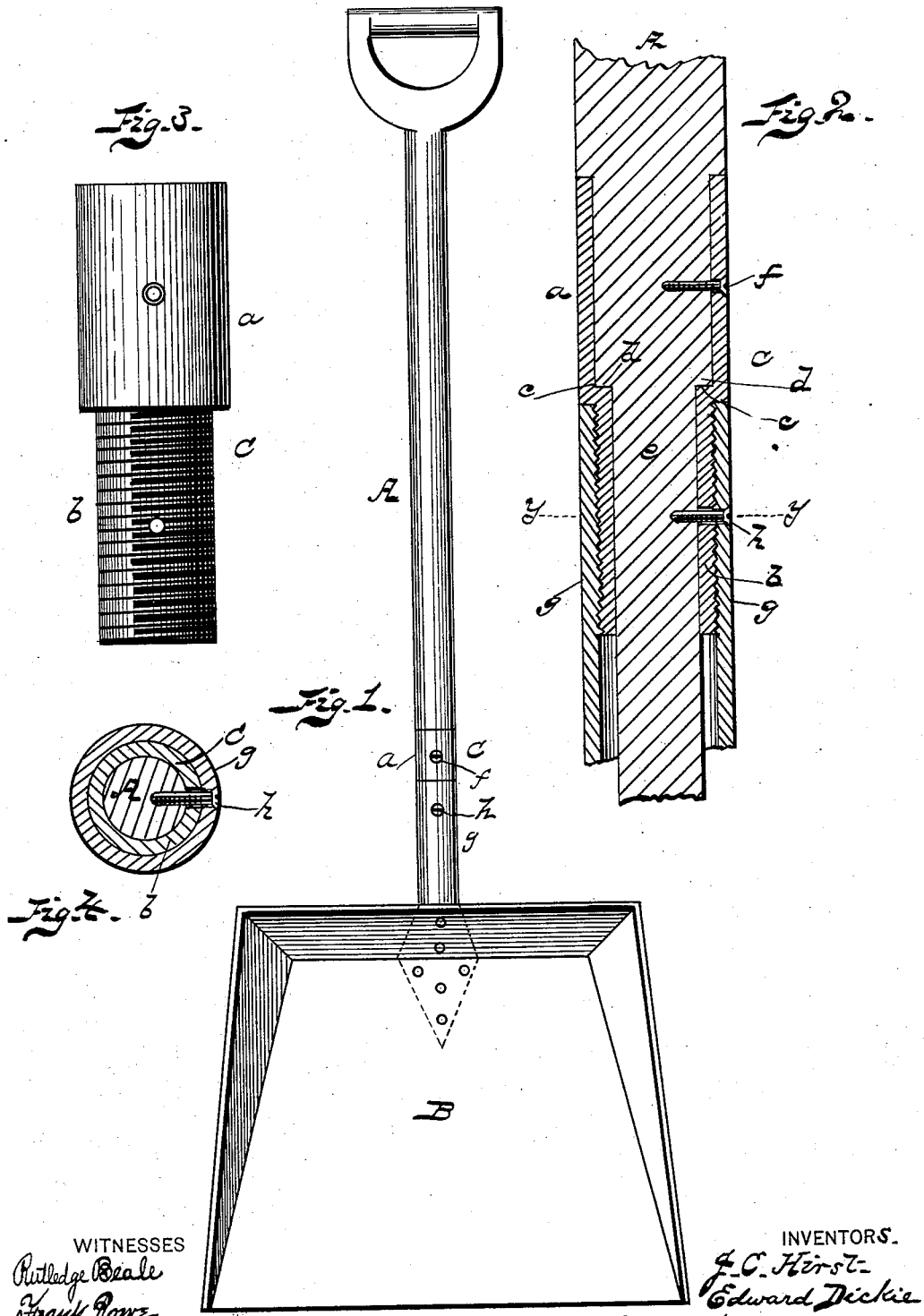
WITNESSES
Rutledge Beale
Frank Rowe
INVENTORS
J. C. Hirst
Edward Dickie
By E. H. Bates their ATTORNEY.

UNITED STATES PATENT OFFICE.

JOHN CHARLES HIRST AND EDWARD DICKIE, OF SOUTH OIL CITY, PA.

TOOL-HANDLE.

SPECIFICATION forming part of Letters Patent No. 324,379, dated August 18, 1885.

Application filed March 30, 1885. (No model.)

*To all whom it may concern:*

Be it known that we, JOHN C. HIRST and EDWARD DICKIE, citizens of the United States, residing at South Oil City, in the county of Venango and State of Pennsylvania, have invented certain new and useful Improvements in Tool-Handles; and we do hereby declare the following to be a full, clear, and exact description of the invention, such as will enable others skilled in the art to which it appertains to make and use the same.

This invention has relation to improvements in tool-handles; and it consists in the construction and novel arrangement of devices hereinafter set forth, and particularly pointed out in the appended claim.

The annexed drawings, to which reference is made, fully illustrate our invention, in which Figure 1 represents a front view of a shovel showing our improvement. Fig. 2 is a vertical sectional view. Fig. 3 is a side view of the ferrule detached from the handle; and Fig. 4 is a cross-sectional view taken on line $y\,y$, Fig. 2.

Referring by letter to the accompanying drawings, A designates the handle of a shovel, and removably attached to the scoop or shovel portion B.

C indicates a ferrule, the upper portion, $a$, of which is of larger diameter than the lower portion, $b$. Annular inner shoulders, $c$, are provided to bear against the shoulder $d$ of the reduced portion $e$ of the handle, and said upper enlarged portion, $a$, is perforated to admit a screw, $f$, which passes into the handle and secures the ferrule thereto. The lower reduced portion, $b$, is externally screw-threaded to engage female threads in the tubular portion $g$, which is secured to the shovel or scoop. Said tube is perforated to receive a screw, $h$, which passes through the same and through the external threaded portion and into the handle, whereby said handle is securely but removably secured to the scoop or shovel. The handle being reduced, as at $e$, permits the upper portion of the ferrule to lie flush with said handle, as shown in the drawings.

It will be observed from the above description, and by reference to the annexed drawings, that this device has many advantages— viz., the saving of either the handle or other part of the tool when one or the other may be broken; the simplicity and rapidity in connecting old and new parts, thus saving the expense of a whole new tool or shovel; and when the two parts are applied to one another the handle is screwed up tight into the tube. The screw is then inserted, thus preventing said handle from turning and becoming loose. Again, this device is applicable to any kind of tool requiring a handle.

We are aware that jointed rods and tubing have been patented prior to our invention, as shown by Patents Nos. 51,910 and 275,050, and do not claim such construction, broadly; but

What we claim is—

The combination, with the handle-socket $g$, provided with the perforation and internal threads, of the ferrule C, having the enlarged upper portion, $a$, perforated to admit the screw $f$, and provided with annular shoulder $c$ and reduced portion $b$, externally screw-threaded from said shoulder to the lower end thereof, and having the perforation which registers with the perforation in the socket, said perforation receiving the screw $h$, and the threads on the reduced portion engaging the threads in the socket, as shown and described.

In testimony whereof we affix our signatures in presence of two witnesses.

JOHN CHARLES HIRST.
EDWARD DICKIE.

Witnesses:
JOHN DUFFY,
MATHIAS MEDITZ.